(12) United States Patent
Braun

(10) Patent No.: US 6,470,622 B1
(45) Date of Patent: Oct. 29, 2002

(54) RODENTICIDE DISPENSING SYSTEM

(75) Inventor: Joseph Braun, Chicago, IL (US)

(73) Assignee: Philip W. Sandler, Chicago, IL (US); a part interest (*) Notice: Subject to any disclaimer, the term of this patent is extended or adjusted under 35 U.S.C. 154(b) by 0 days.

(21) Appl. No.: 09/689,252

(22) Filed: Oct. 13, 2000

(51) Int. Cl.⁷ ............................................. A01M 25/00
(52) U.S. Cl. ........................................ 43/131; 43/132.1
(58) Field of Search ........................................... 43/131

(56) References Cited

U.S. PATENT DOCUMENTS

| | | | | |
|---|---|---|---|---|
| 3,488,879 A | * | 1/1970 | Laughlin | 43/131 |
| 4,835,902 A | | 6/1989 | Sherman | 43/131 |
| 5,038,516 A | | 8/1991 | Doucette | 43/131 |
| 5,136,803 A | * | 8/1992 | Sykes et al. | 43/131 |
| 5,966,863 A | * | 10/1999 | Payton et al. | 43/131 |

\* cited by examiner

Primary Examiner—Peter M. Poon
Assistant Examiner—Joan Olszewski
(74) Attorney, Agent, or Firm—Gerald M. Newman

(57) ABSTRACT

A rodenticide dispensing system includes a bait station as the lower part of a garbage container. The bait station has a horizontally disposed bait rod extending along substantially the full length of the front wall of the container. A hinged, lockable door, provides access to the bait rod, which is releasably supported at its ends. A pair of access holes are provided in the sides of the station for entry and exit of rodents. The access holes are located a substantial horizontal distance away from the bait rod to minimize the likelihood of tampering. The bait rod is supported within the bait station at a desired feeding height for rodents. The bait station may also be constructed as a stand alone unit.

6 Claims, 2 Drawing Sheets

RODENTICIDE DISPENSING SYSTEM

BACKGROUND OF THE INVENTION

This invention relates generally to a rodenticide dispensing arrangement, such as a bait station, for delivering poisoned bait to rodents, such as mice and rats.

Rodents, especially rats, are renowned for proliferating in areas where there is an abundant food supply and generally crowded and unsanitary conditions. Their propensity for spreading disease is well known and in many instances, they may grow to sizes that place humans, especially infants, in significant danger. Suffice it to say that in many areas, and in practically all metropolitan areas, the problem of rodent infestation is a continuing one that requires a substantial amount of time and money to keep under control.

A prime cause of rodent infestation is the lack of care in disposing of food waste and other garbage. The provision of closed refuse/garbage containers to help eliminate the existence of exposed garbage is a major step in solving an infestation problem. Unfortunately, it is difficult to assure full compliance with rules and regulations requiring the proper disposition of garbage and the use of refuse cans, and the problem is an ongoing one.

A widely used solution is to eliminate the rodents by way of trapping, poisoning, etc. There are many rodenticides (rodent poisons) available that may be used, either alone or in conjunction with food, to induce the rodents to ingest the poisons and cause them to die. Unlike trapping, the use of poisons does not result in the carcass of the deceased rodent remaining in the poisoning area (often referred to as a bait station) which eliminates the need for close attention to remove the rodent carcass.

The common attributes of a bait station are that it: hold the poisoned bait; provide easy entry and exit for the rodent; and that it be tamper resistant, i.e., be difficult to inadvertently open or to otherwise disturb the poisoned bait. A bait rod, which holds the poisoned bait, is often secured within the bait station. As a convenience, preformed, cored bait cubes that are positioned or threaded onto the bait rod, are usually provided. The bait stations need only be serviced about once a month to replenish the bait, generally by replacing the empty or partially empty bait rod with a freshly loaded bait rod. The bait stations are strategically placed in the areas of rat infestation and generally secured to the ground or other rigid structure.

U.S. Pat. No. 5,038.516 discloses a rodent poison dispensing station that consists of a locked container with rodent entry and access holes, in which a pair of vertically disposed containers, for continually dispensing liquid and solid baits, are provided. U.S. Pat. No. 4,835,902 discloses a rodent bait station that includes tunnel-like entry and exit holes and internal baffle structures to thwart even intentional tampering. The bait is disposed in the central part of the station behind the baffles.

The present invention discloses an improved rodenticide dispensing system, and in its preferred form, combines a novel bait station with a conventional refuse container to produce a low cost, low maintenance, highly effective rodent elimination mechanism. The bait station is ideally built into a conventional garbage can or container to provide a very attractive site for rodents at which the poisoned bait may be ingested. The proximity of the garbage in the garbage container enhances the effectiveness of the bait station since the odors of the decaying garbage tend to attract rodents. The use of a secured, horizontally disposed bait rod in the bait station enables the bait to be presented at an ideal height and position for rodent feeding and precludes the bait from being dispersed during feeding or movement of the container, such as when the container is emptied. Thus normal emptying of the garbage container without disturbance to, or loss of, the bait may be carried out. The bait station is equipped with a locked door or panel to enable periodic replenishment of the bait, generally by simply replacing the bait rod (about once a month) and to preclude tampering. The access holes are displaced a significant distance away from the bait rod which precludes all inadvertent contact with the bait rod.

OBJECTS OF THE INVENTION

A principal object of the invention is to provide an improved rodenticide bait station.

Another object of the invention is to provide a combination bait station and garbage container.

A further object of the invention is to provide a relatively low cost and highly effective rodenticide dispensing system.

BRIEF DESCRIPTION OF THE DRAWINGS

These and other objects and advantages of the invention will be apparent upon reading the following description in conjunction with the drawings in which.

DETAILED DESCRIPTION OF THE INVENTION

As discussed above, the invention in its broad form comprises an improved bait station for dispensing poisoned bait to rodents and the like. The bait station may be constructed as a stand alone unit. In the preferred form of the invention the bait station is made as an integral part of, or attached to the bottom of, an otherwise conventional garbage container. In this instance, the bait station may be constructed of metal or durable plastic to conform to the materials of the garbage container. It may also obviously be made of any other materials in accordance with cost and durability considerations. When incorporated as part of a garbage container, the garbage container has a false bottom which serves as the roof of the bait station.

Figure 1:
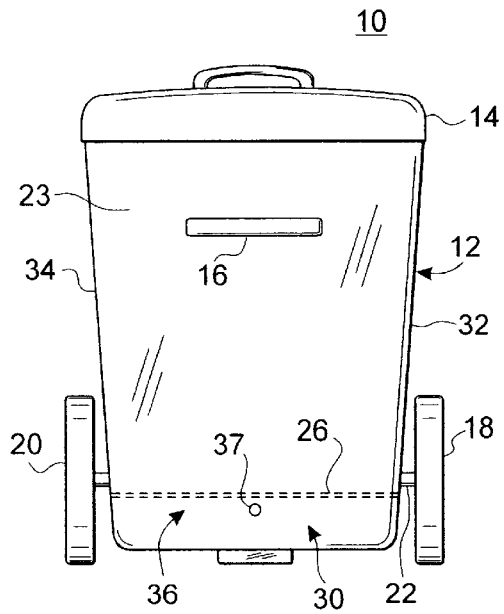
FIG. 1 is a front view of a combination bait station and garbage container of the invention.
Figure 2:
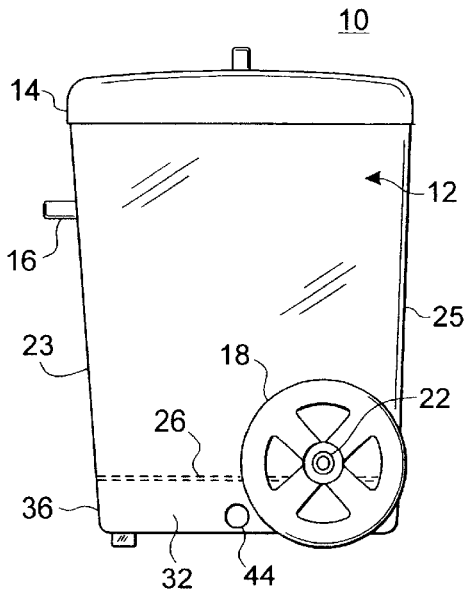
FIG. 2 is a side view of FIG. 1.

Referring to FIGS. 1 and 2, the rodenticide dispensing station of the invention comprises a garbage container 10 having a body 12, a cover 14, a handle 16 and a pair of wheels 18 and 20 that rotate on an axle 22 in the lower portion of body 12. Body 12 includes opposed front wall 23 and rear wall 25 and opposed side walls 32 and 34. Since container 10 is in most respects conventional in design, its construction will not be discussed in detail. In accordance with the invention, container 10 includes a false bottom 26 that, as will be seen, serves as the roof of a bait station 30 formed in the lower part of body 12. In this integrated design, the walls of the garbage container also form the walls of the bait station. Bait station 30 has a generally rectangular configuration (conforming to the dimensions of the garbage container) and is from 4 to 6 inches in height. It is defined by a full length opening in the lower portion of front wall 23, rear wall 38, side walls 32 and 34, roof 26 and a floor 40. A hinged front panel or door 36 serves to close the opening in front wall 23. A latch mechanism 37 is included in door 36, as will be discussed below.

Figure 3:
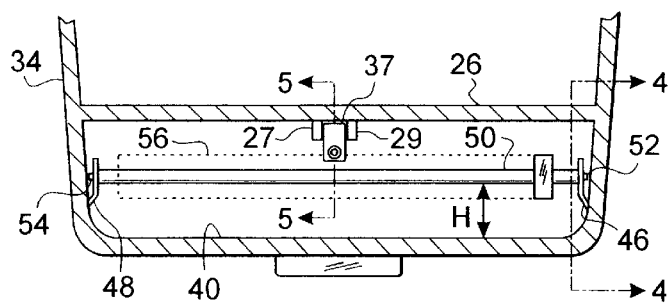
FIG. 3 is an enlarged, partial sectional view of the bait station portion of FIG. 1.
Figure 4:
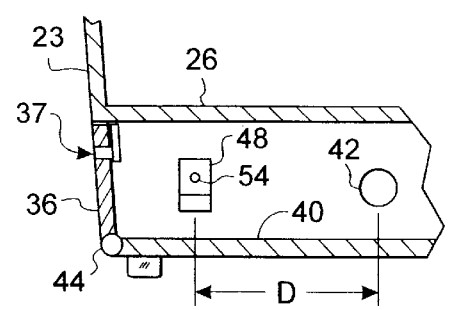
FIG. 4 is a view taken along line 4—4 of FIG 3.

As illustrated in the partial sectional views of FIGS. 3 and 4, door 36 is connected to floor 40 by means of a hinge 43 so that door 36 may be opened to provide access to the interior of bait station 30. In particular access is provided to a horizontally disposed bait rod 50 that is supported from side walls 32 and 34 at a distance H above floor 40. In practice this distance H is 2 to 3 inches above the floor, which locates bait cubes 56 on the bait rod 50 at an ideal feeding height for rodents. The horizontal disposition of the bait cubes 56 is therefore fixed at this feeding height, which contributes to the effectiveness of the bait station. Details of the bait rod 50 and bait cubes 56 are best seen in FIG. 7. It should be noted that, while latch 37 is generally disclosed in FIGS. 3 and 4, reference to FIGS. 5 and 6 should be made for additional details of the construction and operation of the latch mechanism.

A pair of biased flanges 46 and 48 are secured, by any convenient well-known means, to the insides of side walls 32 and 34, respectively and serve to removably support the bait rod 50 in position. As will be seen, the biased flanges 46 and 48 provide a simple method of removably securing the bait rod 50 in position so that it is not dislodged during normal movements of the garbage container. A pair of circular access holes 42 and 44 are provided in substantially axial alignment in side walls 32 and 34, respectively, to provide for easy entry and exit of rodents. To preclude larger, unwanted, animals from entering the bait station, the access holes 42 and 44 have diameters of approximately 2 inches. The access holes are also horizontally displaced a substantial distance D from flanges 46 and 48 to preclude tampering with the bait cubes 56 on bait rod 50.

Figure 5:
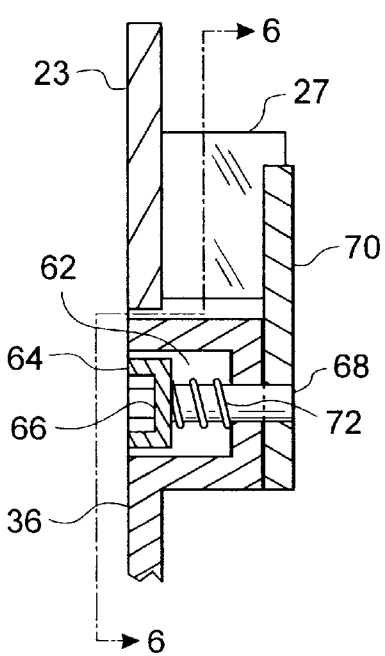
FIG. 5 is an enlarged, partial side view of the locking mechanism taken along line 5—5 of FIG. 3.
Figure 6:
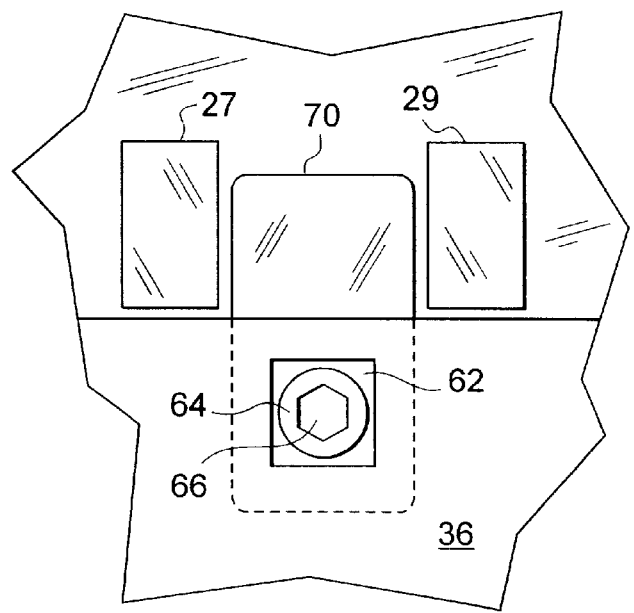
FIG. 6 is taken along line 6—6 of FIG. 5.
Figure 7:
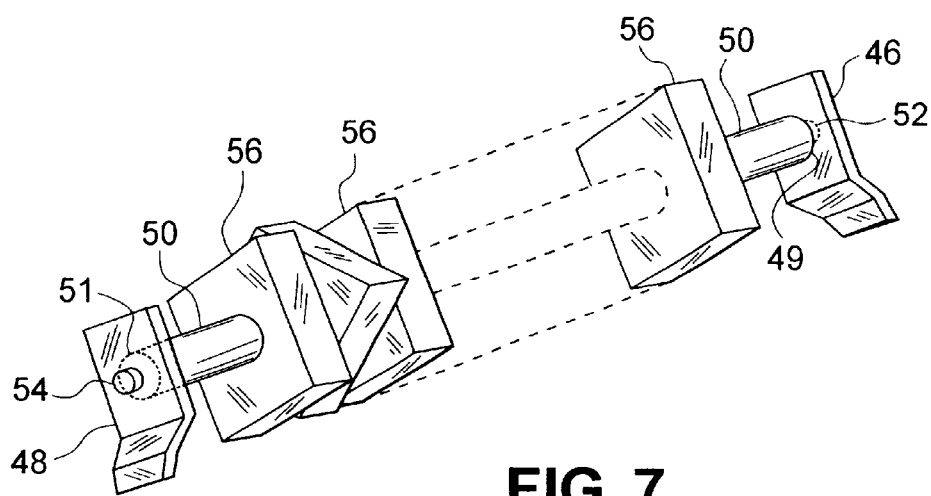
FIG. 7 is a perspective of a bait rod and bait illustrating the biased bait rod-securing flanges.

In FIGS. 5 and 6, a form of latch mechanism suitable for use with the invention is disclosed. It will be understood that other locking devices may be used with the invention with equal effect. A pair of separated bosses 27 and 29 extend from the inner surface of front wall 23 and serve to captivate a rotatable, inwardly-displaceable tang 70 on the latch mechanism, which is secured in a suitably shaped recess 62 formed in door 36. Tang 70 is affixed to a shaft 68 that includes a head 64 that has a specially shaped inset 66 therein. A compression spring 72 urges shaft 68 to the position shown in FIGS. 5 and 6 with tang 70 abutting the bottom of recess 62 and captured between bosses 27 and 29. Inset 66 is adapted to receive a conventional Allen head wrench (not shown).

In operation, a proper sized Allen wrench is inserted into inset 66 of head 64 and the shaft 68 is depressed, compressing spring 72 and moving tang 70 beyond the confines of the bosses 27 and 29. In this position, shaft 68 and tang 70 may be rotated either to its locked or unlocked position. Obviously, other configurations of inset 66 may be used, the criterion being to require a special mating key for locking and unlocking the door 36 of bait station 30. The bosses 27 and 29 may conveniently be molded into container 12, or may be separately affixed thereto. Similarly, recess 62 may be molded into door 36. Alternatively, the entire latching mechanism may be a manufactured bolt-on arrangement. It will be appreciated by those skilled in the art that such details are not limiting of the invention.

In FIG. 7, bait rod 50 is shown as a cylindrical rod having shoulders 49 and 51 and reduced diameter ends 52 and 54, respectively. The bait cubes 56, which are generally cored, are installed along the bait rod, which is inserted (or removed) from flanges 46 and 48 by deflecting one of the flanges so that the corresponding one of ends 52 and 54 of the bait rod is dislodged from its apertures in the corresponding flange, This enables simple removal and installation of bait rods in the bait station while providing a very secure support system for the bait rod to enable it to remain in place despite substantial movements of the container, such as occur during removal of the contents of the container. It will also be appreciated that the specific design details of the latch, support flanges and bait rod should not be considered limiting of the invention, it being expressly understood that other, conventional designs, of these elements may be employed within the spirit and scope of the invention.

What has been described is a novel bait station and rodenticide dispensing system. It is recognized that numerous changes to the described embodiment of the invention will be apparent to those skilled in the art without departing in from its true spirit and scope. The invention is to be limited only as defined in the claims.

What is claimed:

1. A refuse container comprising:

a false bottom in said container forming a separate housing;

access holes, dimensioned to permit ready access to said separate housing, on opposed first and second side walls of said separate housing;

a securable vertically disposed door extending substantially along the full length of said separate housing;

a horizontally disposed bait rod in said separate housing; and means for removably supporting said bait rod between the floor of said separate housing and said false bottom.

2. The container of claim 1, wherein said supporting means comprise supports secured to said first and second side walls for supporting said bait rod at its ends.

3. The container of claim 2, wherein said supports are located to support said bait rod above the floor of said separate housing at a desired feeding height for rodents.

4. The container of claim 3, wherein said supports comprise biased flanges affixed to said first and second side walls in substantially axial alignment and displaced from said access holes, said biased flanges each including an aperture for receiving an end of said bait rod.

5. The container of claim 4, wherein said securable door includes a latching mechanism, cooperating with said separate housing, which is openable by a mating key.

6. A refuse container comprising:

a false bottom in said container forming a separate housing;

access holes, dimensioned to permit ready access to said housing by rodents, in substantially axial alignment on opposed first and second side walls of said separate housing;

a bait rod horizontally extending between said first and second side walls along substantially the full length of said separate housing;

a securable vertically disposed door on said separate housing for accessing said bait rod;

biased flanges secured to said first and second side walls and displaced horizontally from said access holes for removably supporting said bait rod at its ends at a desired feeding height for said rodents between the floor of said separate housing and said false bottom, said biased flanges each including an aperture for receiving an end of said bait rod; and said securable door including a latching mechanism, cooperating with said separate housing, which is openable by a mating key.

* * * * *